United States Patent [19]

Waiblinger

[11] 4,195,961

[45] Apr. 1, 1980

[54] APPARATUS FOR LOADING AND UNLOADING A WORK SPINDLE OF A MACHINE TOOL

[75] Inventor: Paul Waiblinger, Esslingen, Fed. Rep. of Germany

[73] Assignee: Index-Werke KG Hagn & Tessky, Esslingen, Fed. Rep. of Germany

[21] Appl. No.: 883,141

[22] Filed: Mar. 3, 1978

[30] Foreign Application Priority Data

Mar. 11, 1977 [DE] Fed. Rep. of Germany ....... 2710661

[51] Int. Cl.² .............................................. B65G 59/02
[52] U.S. Cl. .................................... 414/120; 414/730; 414/741
[58] Field of Search ............. 214/1 BD, 1 BV, 1 CM, 214/8.5 R, 8.5 A, 8.5 C, 8.5 D; 271/103, 153; 414/117, 118, 120, 121, 122, 729, 730, 737, 739, 740, 741

[56] References Cited

U.S. PATENT DOCUMENTS

| | | | |
|---|---|---|---|
| 3,079,011 | 2/1963 | Gollwitzer et al. | 214/8.5 D X |
| 3,572,549 | 3/1971 | Willsey | 214/8.5 C X |
| 3,586,314 | 6/1971 | Samoggia | 271/153 X |
| 4,081,945 | 4/1978 | Calvert | 214/8.5 D X |

FOREIGN PATENT DOCUMENTS

| | | | |
|---|---|---|---|
| 1552773 | 7/1971 | Fed. Rep. of Germany | 214/8.5 C |
| 2159552 | 6/1973 | Fed. Rep. of Germany | 214/8.5 C |

*Primary Examiner*—L. J. Paperner
*Attorney, Agent, or Firm*—Shenier & O'Connor

[57] ABSTRACT

An apparatus for transferring workpieces from a store to a machine tool and vice versa has an arm, with a gripper at one end to pick up a workpiece. The arm pivots so that the gripped workpiece moves in an arc from one location to the other. When the workpiece is being picked up or put back in the store, the grippers have to be opened or closed. To do this, the arm is allowed to fall below the horizontal, when it is positioned at the store. When the arm is then raised to the horizontal (either by lifting the workpiece in the store or by lowering the pivoted end of the arm) an actuating device is operated which actuates opening or closing of the grippers.

6 Claims, 12 Drawing Figures

APPARATUS FOR LOADING AND UNLOADING A WORK SPINDLE OF A MACHINE TOOL

The invention relates to apparatus for loading and unloading machine tools fitted with horizontal work spindles, having a conveyor device which comprises a frame and which is provided with a rotary shaft which is arranged parallel to the work spindle and which supports a swing arm which is arranged perpendicular to the shaft axis, is pivotal and is displaceable along the shaft axis, the swing arm being reciprocably pivotal between a first storage position and a machine position and comprising at its front end at least one gripper for gripping a work piece; and having an entry store for storing blanks by means of which the stored blanks are successively movable into a defined delivery position.

Apparatus of the kind described above is already known from German Auslegeschrift No. 2 159 552.

The construction disclosed in that Specification comprises as a store a storage chain which is guided in a vertical plane, partly in a meandering shape, and in which the work pieces to be machined are horizontally stored. The gripper of the swing arm receives the stored work pieces at a predetermined delivery location to which the work pieces are to be supplied one after the other, for which purpose the swing arm is swung into a horizontal position in front of the store. When the swing arm is located in front of a work piece placed in readiness it is controlled in the direction of the latter, the gripper engaging the work piece around the outer periphery. Thereafter the work piece is withdrawn from the store or from the respective holder of the storage chain by means of the swing arm and is fed to a chuck of the machine tool by a pivotal movement of the swing arm.

Thus this known apparatus does not permit work pieces to be stacked coaxially one on top of the other. Furthermore, in order to push the gripper over the work piece for receiving the work piece, the displacement path of the swing arm must be adjusted in accordance with the axial length of the work pieces. Finally this construction does not permit the swing arm to be fitted with two grippers in order to remove a treated work piece from a machine spindle and to deposit it in another store. For this purpose rather a further swing arm fitted with a gripper is required by means of which finished treated work pieces may be inserted in appropriate storage receivers on the side located opposite the delivery side of the store.

Another loading and unloading apparatus for machine tools is already known wherein, as in the construction described above, a swing arm fitted with a gripper is provided which is associated with an entry store in which the work pieces to be supplied to the machine tool may be stored in a coaxial position one on top of the other. This store is provided with a lifter device by means of which the work piece stack is raised every time a work piece has been removed from the store in such a manner that the respective uppermost work piece is presented in a position in which it can be gripped by the gripper of the swing arm in the storage position thereof. This is described in German Offenlegungsschrift No. 2444 124.

Although this known construction renders it possible to fit the swing arm with two grippers, for example in order to supply an untreated work piece to the work spindle of a machine tool as well as also to remove previously a finished treated work piece from the latter and to deposit it in a further store, this kind of construction requires nevertheless also an adjustment dependent upon the axial length of the work pieces to be stored, and of the stroke path of the work piece stack or stacks for placing the respective uppermost work piece of a stack in readiness in the delivery position.

Thus both these apparatuses mentioned have a control device in common which must be set for adjustment to the axial length of the work pieces in such a manner that a reliable work piece removal is ensured by means of the swing arm gripper. Apart from the fact that thus every new work piece series necessitates a fresh adjustment of this adjusting device, difficulties may arise when clamping blanks in as much as the axial length thereof sometimes differs by considerable amounts which in turn must be taken into account during the adjustment of the displacement path for adjusting the swing arm in the axial direction, and the shaft supporting said arm for the purpose of inserting a work piece into the work spindle of a machine tool.

According to the invention, there is provided an apparatus for loading or unloading workpieces to or from a machine tool having a horizontal work spindle, the apparatus comprising a shaft rotatable about its own axis, which shaft is to be arranged parallel to the work spindle, a swing arm supported by the shaft so as to be perpendicular to and displaceable along the shaft axis and to be pivotable about the shaft axis between a store position and a tool position, workpiece storage means where workpieces to be machined can be picked up or machined workpieces can be put down, at least one gripper for gripping a workpiece and an actuating device for actuating said at least one gripper, the actuating device itself being actuated by movement of the swing arm from a position where it is inclined to the horizontal to a position where it is horizontal, said movement being caused by vertical movement of a member supporting the swing arm.

The uppermost blank of a stack of blanks which is to be delivered to the work spindle of a machine tool by means of this apparatus is moved upwardly together with the respective stack by a lifter member of the entry store until the swing arm has been swung in the same direction into the horizontal position by the same by means of the gripper resting against the same. As soon as the swing arm has attained this position it is ensured that the blank to be gripped is located in an accurate gripping position, so that tilting of the blank while being received by the gripper is as good as excluded. The advantage of the invention, however, resides in the fact that the work piece may differ considerably from each other in respect to their axial length and nevertheless the uppermost work piece is always presented ready in an accurate gripping position. This would also be the case if work pieces of different lengths were stacked.

Alternatively, for adjusting the swing arm into its horizontal position, the shaft supporting the swing arm may be displaced downwardly parallel to itself by a corresponding path, in kinetic reversal of the apparatus having a stack of work pieces. In the performance of this displacement movement, the gripper which remains initially at a spacing above a work piece present in the store, is then moved into engagement with the work piece to be gripped, the swing arm is swung about the workpiece during lowering into the horizontal position of the shaft carrying the same. In the horizontal position of the swing arm the gripper assumes in this case a perfectly adjusted position relatively to the work piece to be lifted off, and is located in an accurate gripping position.

Moreover this alternative construction permits the store to be designed in a constructionally different manner, since in this case the work piece need not be lifted for adjusting the swing arm to the horizontal position. For this reason the store may be constructed for example in the form of a switch plate on which workpieces to be supplied to a machine tool are deposited at predetermined location, or may be integrated with particular advantage in a production line, with the store formed for example by a horizontal conveyor on which work pieces can be conveyed successively under the gripper of the swing arm.

Finally, the apparatus offers the advantage of a necessarily present safety switch-off when the store does not hold a work piece in readiness for transfer, because in this case the swing arm does not find an abutment which is necessary for its deflection into the horizontal position.

The invention will now be further described, by way of example, with reference to the accompanying drawings in which.

Figure 1:
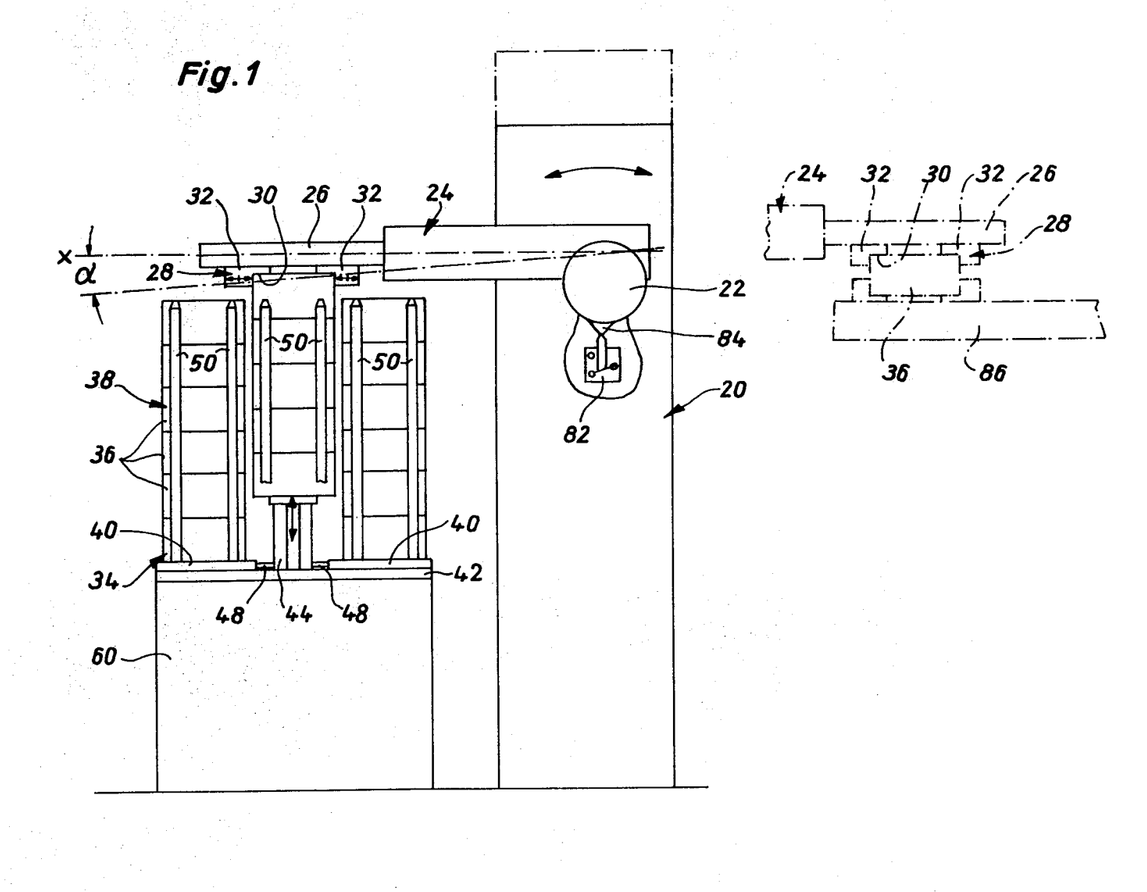
FIG. 1 is a front view of a first embodiment of apparatus for loading a machine tool with e.g. blanks.
Figure 2:
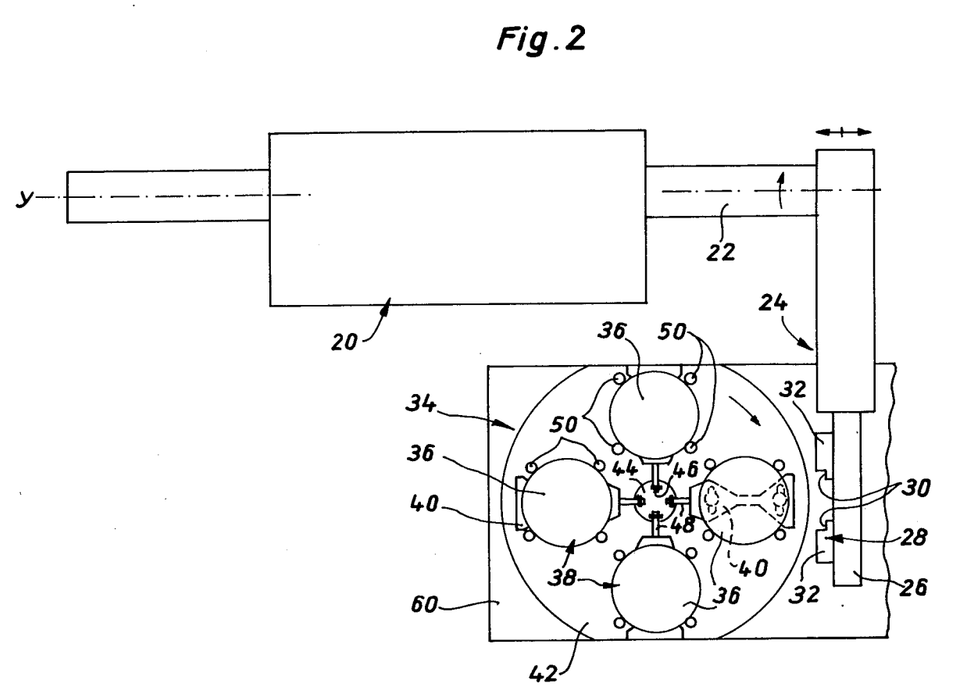
FIG. 2 is a view from above of the apparatus of FIG. 1.
Figure 3:
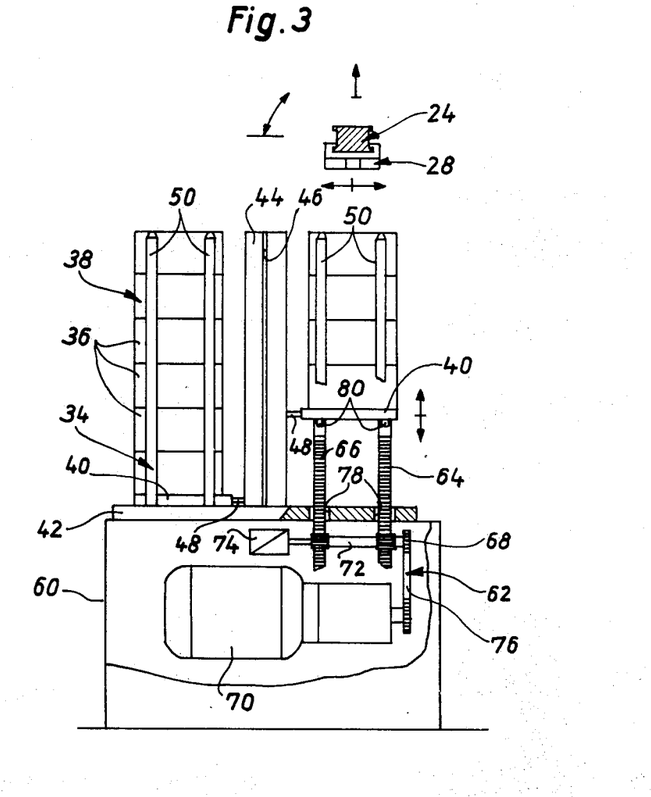
FIG. 3 is a side view partly broken open of the blank store of the apparatus of FIG. 1 and 2.

The apparatus illustrated in FIGS. 1 to 3 serves for supplying work pieces in particular blanks to a treatment location. This apparatus comprises a mounting frame denoted as a whole by 20, in which a swing shaft 22 is horizontally mounted and is displaceable by means of a drive in a rotary direction as well as also in an axial direction.

At the front end of the swing shaft, a swing arm 24 is rigidly fixed on this shaft and extends away therefrom perpendicularly relatively to its longitudinal axis. A gripper support 26 is located at the front end of the swing arm and supports an axial gripper denoted as a whole by 28. The description axial gripper has been selected for the reason that when a work piece is gripped, the same comes into abutment with axial abutment faces 30 of e.g. its clamping jaws 32.

In FIG. 1 the transfer location is indicated by a dash-dotted line to which a work piece is to be conveyed by means of the apparatus. Disposed opposite this transfer location the apparatus comprises a work piece store, denoted as a whole by 34, in which for example blanks 36 are stored which are grouped to form blank stacks 38. It may be seen from FIG. 2 that the work piece store contains for example four work piece stacks which are disposed at the same mutual angular spacing. Each work piece stack sits on a tray 40 which in turn rest together on a disc-shaped pallet 42 in the centre of which an upwardly extending central column 44 is rigidly attached. The trays 40 accommodating the work piece stacks are loosely guided by means of engagement fingers 48 in longitudinal slots 46 of the central column. The stored blanks 36 are guided for example at the outer periphery between four guide rods 50. These are radially adjustable relatively to their longitudinal axis, in the pallet and are provided to be fixed thereon in such a manner that their position can be adjusted to the outer diameter of blanks. For work pieces with a large internal diameter they may alternatively be so arranged that the work pieces may be pushed onto the guide rods. For finished articles having a relatively small internal diameter trays are available with a bore through which merely a guide mandrel extends which is held on the pallet.

The pallet 42 is rotatable about its axis in order to permit the individual work piece stacks to be moved into a position in which they can be de-stacked by means of the axial gripper 28 of the swing arm 24 and conveyed to the transfer location. For this purpose a Maltese disc 52 is fixed to the underside of the pallet, such as is illustrated with reference to the constructional example of a work piece store illustrated in FIG. 12, and is associated with a crank 56 which is drivable by means of a driver motor 54 and the cam pin 58 of which co-operates with the Maltese disc. The latter is so designed that each crank revolution effects a rotation of the pallet through 90°, corresponding to the number of four work piece stacks provided, so that the work piece stacks can be controlled individually successively into the same de-stacking position.

In order to remove the work pieces from a stack, the work piece stack located in the de-stacking position is raised by a predetermined amount; this will be discussed in detail further below. For this purpose a lifting device denoted as a whole by 62 is provided in the lower part 60 constructed as a casing of the work piece store 34 and comprises for example two vertically disposed mutually spaced toothed racks 64,66 which are vertically displaceable by means of a driving shaft 72 which is drivable by a brake motor 70 by way of a pinion 68 and which controls at the same time a path indicator 74. For example, the driving connection of pinion 68 and brake motor 70 is realised by a driving chain 76. For each work piece stack, two recesses 78 penetrating through the pallet 42 are associated in the pallet with the two toothed racks, so that the toothed racks can penetrate through the pallet in the upward displacement direction. At the upper end the toothed racks carry respective cross-rails 80 which come into engagement with the underside of the tray 40 to be lifted and receive the latter in a stable non-tilting manner.

In order to move a fresh work piece stack into the de-stacking position, the toothed racks are first displaced downwardly to such an extent that the cross-rails 80 thereof are located below the pallet 42, whereupon the latter is rotated through 90° by means of the driver motor 54. Thereupon the toothed racks are placed again against the underside of the respective tray 40.

As may be seen from FIG. 1, the swing shaft 22 is associated with an end switch 82 which is controllable by means of a control cam 84 provided on the swing shaft and by which the lifting device 62 of the work piece store 34 can be stopped in predetermined lift positions. Additionally the gripper support 26 is rotatable about its longitudinal axis X, preferably in 90° steps.

This apparatus operates in the following manner:

Let it be assumed that the work piece store 34 is fitted with four work piece stacks 38 one of which is located in the de-stacking position.

At the start of a transfer operation, the swing arm 24 of the apparatus is located in its rest position in which, as indicated by a dash-dotted line in FIG. 1, the arm is retained downwardly inclined at an acute angle α to the horizontal. In this case the clamping jaws 32 of the axial gripper are located in the open position. In order to grip a stored work piece, for example a blank, the lifting device 62 is switched on, whereby the blank stack located in the de-stacking position is moved upwards. In the course of the lifting movement the uppermost blank of this stack comes into contact with the clamping jaws of the axial gripper 28; the lifting speed is preferably reduced shortly before these parts come into mutual contact. The lifting movement is continued in this case until the swing arm 24 driven by the upwardly moving stack assumes its horizontal position illustrated in FIG. 1. In this position the control cam 84 of the swing shaft 22 actuates the switch 82 by which the lifting device is stopped. In this position the swing arm 24 ensures that the one end face of the blanks to be removed from the stack rests against the abutment face 30 of the clamping jaws 32 and the blank is accurately positioned in the gripper. Simultaneously with the stopping of the lifting device the clamping jaws 32 of the axial gripper 28 are controlled into their clamping position and the blank is clamped thereby, whereupon the axial gripper 28 is moved into the transfer position by swinging the swing arm 24. There the gripper support 26 may be rotated for example through 180°, in order that the blank 36 removed from the stack may be transferred for example to a turret 86 of a machine tool. Alternatively the blank may be transferred just as well to the chuck of the horizontal work spindle of a machine tool, for which purpose the gripper support 26 would have to perform merely a 90° rotation; following this the swing shaft 22 would have to perform additionally an axial movement in order to introduce the blank into the chuck.

Owing to the fact that the swing arm 24 in conjunction with the swing shaft 22 serves as control member for the vertical displacement of the work piece stack, expensive sensors and feeler devices on the swing arm and on the axial gripper, respectively, may be omitted. Since always the uppermost work piece of a stack is scanned by the swing arm 24, addition of errors does not come into operation. Likewise severe differences of the axial length of the work pieces cannot adversely affect the functioning of the apparatus. Finally, the work piece is necessarily accurately aligned in the axial gripper for the reason that the lifting movement of the work piece stack to be de-stacked occurs against the effect of a force acting upon the swing arm 24.

Figure 4:
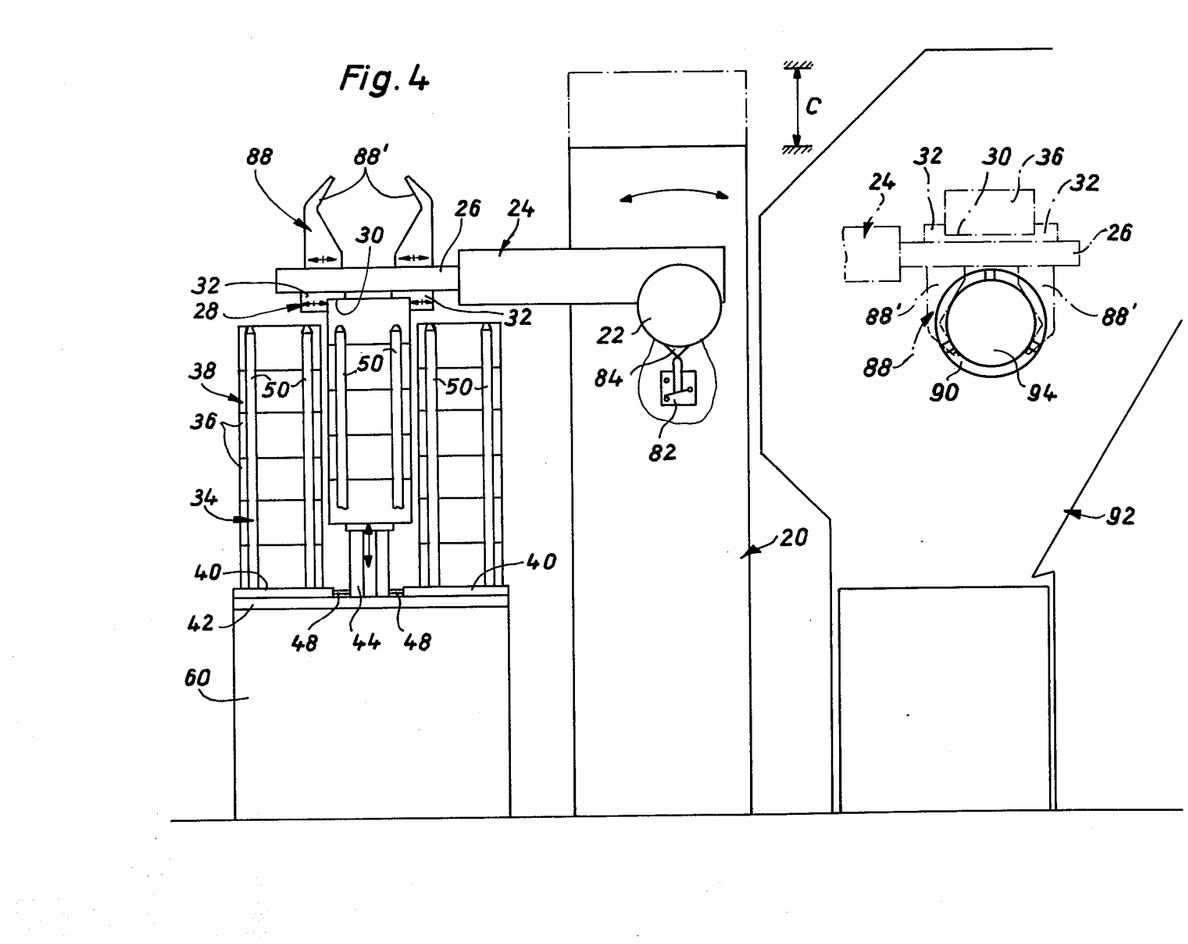
FIG. 4 is a front view of a second embodiment of the invention.

As may be seen from the constructional example of FIG. 4, alternatively two grippers 88';88' may be provided in mutually opposite positions on the gripper support 26 of the swing arm 24. In this case the apparatus is capable to supply the work pieces to a transfer location as well as to receive them again after treatment has been effected, and to deposit them at a further location. In the present constructional example the gripper 88 forms for example a radial gripper in order to remove a finished treated work piece 94 which has been supplied as blank into the chuck 90 of the horizontal work spindle of a machine tool 92, from the chuck and to deliver it at a further location. The combination of an axial gripper 28 and a radial gripper 88 is particularly suitable in this case for short turned articles which in the finished state can be advantageously gripped at the periphery by the radial gripper, when the swing arm 24 swings downwardly in the clockwise direction according to FIG. 4. It must be noted in this case that when the swing arm is fitted with two grippers the part of the mounting frame 20 bearing the swing shaft 22 is adjustable in the vertical direction by the amount C. This adjustment may be necessary in order to lift the blank to be de-stacked out of the guide rods 50; however this adjustability is imperative when the swing arm is fitted with an axial gripper 28 and a radial gripper 88, in order to compensate the centre offset of these two grippers. The operation of the apparatus according to FIG. 4 is as follows:

After a blank has been gripped by the axial gripper 28, the mounting frame 20 is controlled upwards by the amount C, in order to lift the blank out of the guide rods 50. Thereafter the swing arm 24 is swung upwards about the Y-axis of the swing shaft, for example through 90°. The radial gripper 88 points now in the direction of the machine tool 92. The swing arm remains in this position until for example the turning operation of the work piece located in the machine is terminated and the displaceable covers covering the operating space of the machine have been controlled into the open position. Thereafter the swing arm 24 is swung once more through 90° about the Y-axis of the swing shaft, whereby the radial gripper 88 is moved into its removal position and the work piece is taken up at the periphery by the gripping jaws 88' thereof.

After the finished article has been axially withdrawn from the chuck 90, the gripper support 26 swings through 90° about the X-axis, so that then the blank is moved to a position in line with the chuck and is inserted in the latter by appropriate axial displacement of the swing shaft 22. In this case the centre offset of the two grippers 28, 88 is compensated by a vertical movement parallel to itself of the swing shaft 22. When the blank has been received by the chuck 90, the swing arm 24 is swung in an anti-clockwise direction according to FIG. 4, in order to deposit the finished article received by the radial gripper at a transfer location, for example on a slide or the like, for which purpose it may be necessary to rotate the gripper support 26 once more through 90° in a certain direction.

The swing arm 24 may alternatively be fitted with two axial grippers in place of one radial gripper 88, which is advisable in particular for manipulating short turned articles. In analogy herewith the swing arm may alternatively be fitted with two radial grippers 88, which is advisable in particular when shaft members are to be manipulated and under certain circumstances are to be turned over in the working space of the machine; this may be effected by twice rotating the gripper support 26 through 90°.

Figure 5:
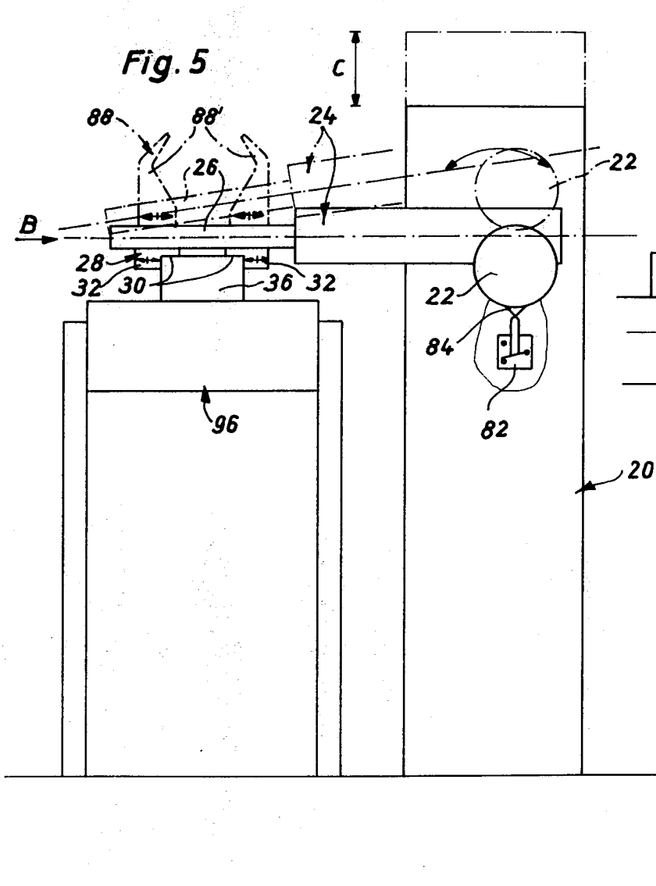
FIG. 5 is a front view of a third embodiment of the invention.
Figure 6:
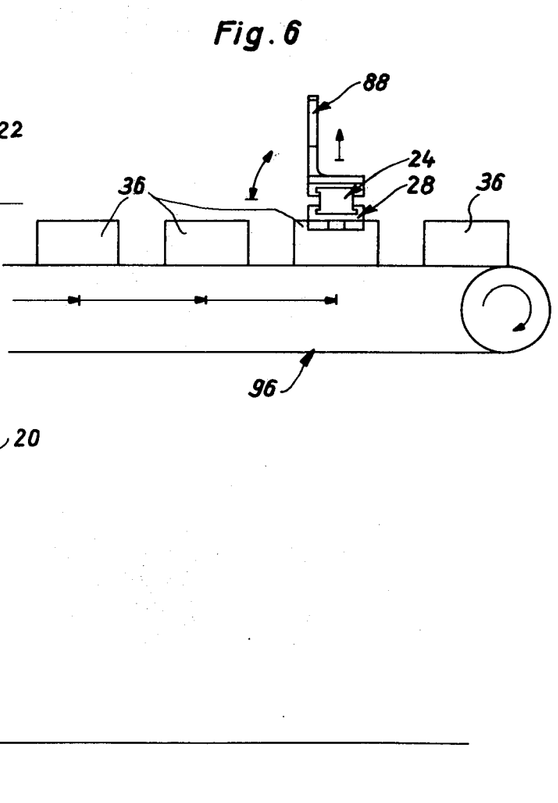
FIG. 6 is a view of the apparatus of FIG. 5, seen in the direction of the arrow B.
Figure 7:
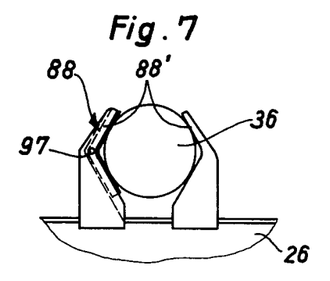
FIG. 7 is a front view of the peripheral gripper of the apparatus of FIGS. 4 to 6.
Figure 8:
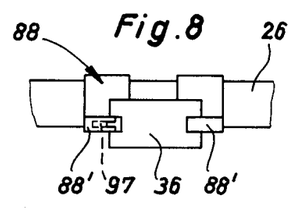
FIG. 8 is a view from above of the peripheral gripper shown in FIG. 7.
Figure 9:
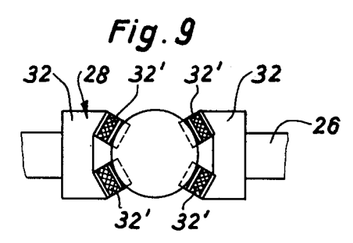
FIG. 9 is a front view of the axial gripper of the apparatus of FIGS. 4 to 6.
Figure 10:
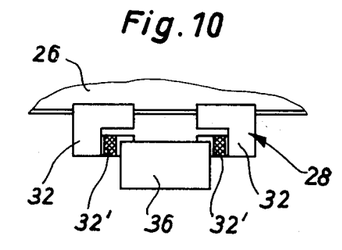
FIG. 10 is a view from above of the axial gripper of FIG. 9.

FIGS. 5 and 6 illustrate a further constructional example of apparatus for delivering and/or receiving work pieces.

As to the constructional arrangement thereof, this corresponds in this case to the construction of FIG. 1 in so far as the mounting frame and the swing arm are concerned; in analogy with the embodiment according to FIG. 4, the gripper support 26, however, may additionally be fitted with a further gripper, for example a radial gripper 88.

The work piece store is different from the embodiment of FIG. 1 and is formed in the present case for example by a belt conveyor 96. This means that work pieces to be received, for example blanks, retain their delivery position unchanged when they are received by the axial gripper 28.

The readiness position of the swing arm 24 for receiving a blank 36 supplied thereto is illustrated by a dash-dotted line in FIG. 5. In this case also the swing arm is located directed downward at an acute angle with the horizontal, the swing shaft supporting the swing arm 24 being located in an upper starting position, as indicated by a dash-dotted line. For receiving a blank from the conveyor, the part of the mounting frame bearing the swing shaft 22 is controlled downwards in this constructional example by the amount C, whereby necessarily the open axial gripper 28 comes into contact with the blank. In this case the blank forms a counter-support for the swing arm 24, so that the latter is slowly adjusted to the horizontal position during this downward movement of the swing shaft 22. In this position the control cam 84 of the swing shaft actuates the end switch 82 whereby the device (not illustrated in FIG. 5) for downward and upward displacement of the mounting casing part bearing the swing shaft is stopped. In this position of the swing arm it is then likewise ensured that the blank and the axial gripper are mutually axially aligned. Furthermore, in analogy with the previously described construction, it is ensured that differences in the axial length of the blanks to be received cannot have a disadvantageous influence on the functioning of the apparatus. For delivering the work piece received, the swing arm must be swung in the manner described in connection with FIG. 1 and FIG. 4; again the swing shaft 22 may be controlled upwards by the maximum path C or a fraction thereof, in order to obtain an accurate delivery position of the axial gripper 28. Corresponding to the construction according to FIG. 4, this apparatus also may be utilised for example for receiving a treated work piece from a machine tool if, as mentioned already, a further gripper, for example a radial gripper 88, is additionally provided on the gripper support 26, by means of which a finished treated work piece can be deposited at a transfer location. Likewise this apparatus permits the finished articles to be deposited turned over for further treatment of the second side.

In this case FIGS. 7 to 10 illustrate the construction of the axial and radial grippers. According to FIGS. 7 and 8 the one of the two gripper jaws 88' forming a prism is of solid construction, whereas the other gripper jaw 88' is formed by a rocker pivotal about a pivot axis 97, whereby excessive movement is avoided and it is accordingly ensured that the gripper jaws rest uniformly on four peripheral locations of the work piece. In contrast the clamping jaws 32 of the axial gripper 28 are each fitted with two elastic abutment members 32', preferably formed by appropriate rubber elements, whereby deviations in shape of the blanks can be compensated within certain limits.

Figure 11:
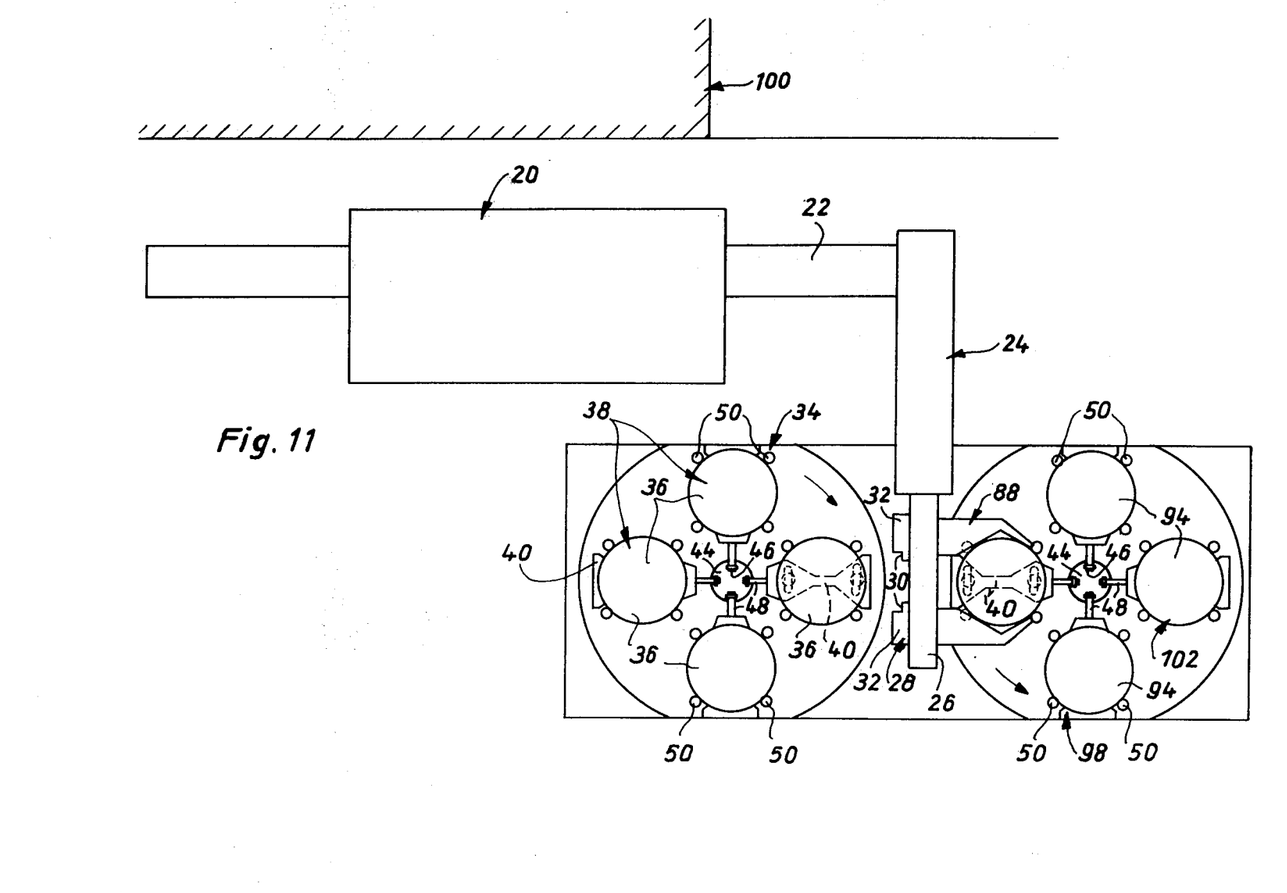
FIG. 11 is a view from above of a fourth embodiment of the invention by means of which work pieces removed from the work spindle may be deposited in a finished article store.
Figure 12:
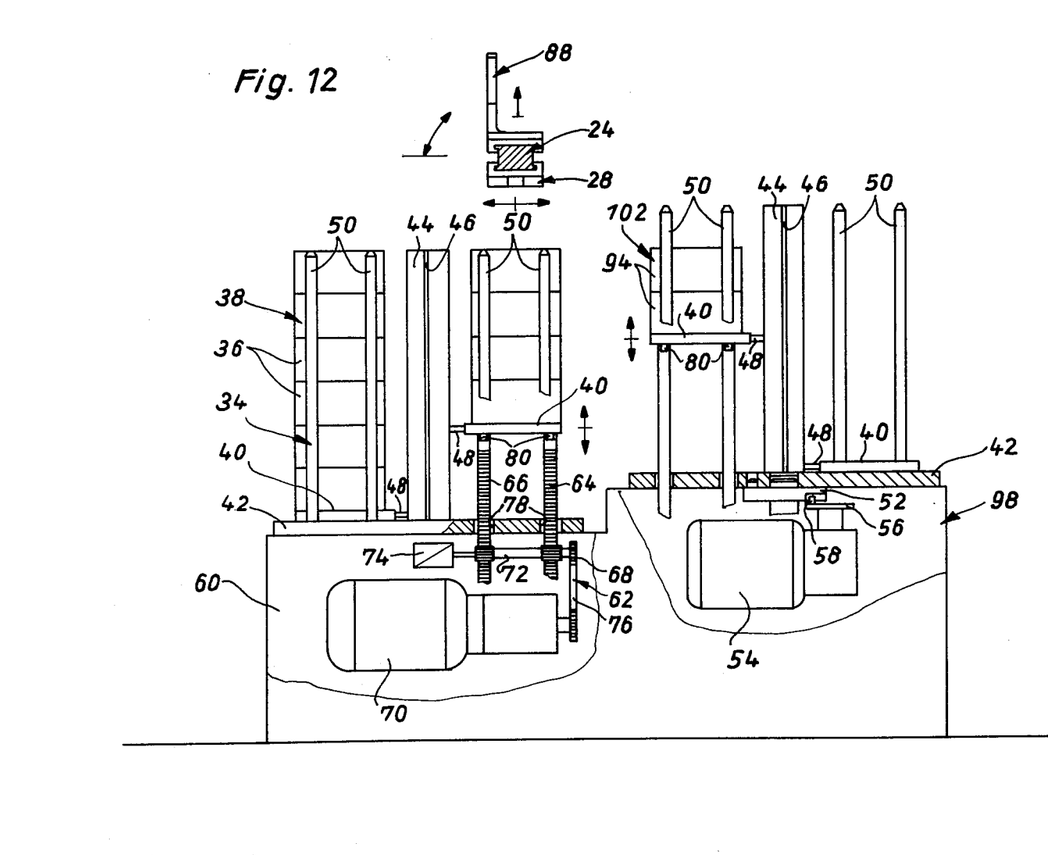
FIG. 12 is a side view, partly broken open, of the storage device of the apparatus of FIG. 11.

The apparatus illustrated in FIGS. 11 and 12 constitutes a further development of the construction of FIG. 4, in that it is in a position not only to supply stacked work pieces, for example blanks, to the work spindle of a machine tool, but also to turn over partly treated work pieces and, after treatment has occurred, to remove the finished articles from the machine tool and to deposit them again stacked one on top of the other.

It comprises in addition to a store 34 for blanks a further store 98 for finished articles which as to their construction correspond to that of FIG. 3. These two stores are disposed one behind the other in a plane which is parallel to the plane in which the swing shaft 22 is located.

The manner of working of this apparatus is as follows: As soon as the swing arm 24 is located in its rest position indicated in FIG. 1 by a dash-dotted line and in which it is inclined downwards at an acute angle to the horizontal and the axial gripper thereof is swung upwards into its gripping position by the blank stack 38 located in the de-stacking position, the part of the mounting frame 20 bearing the swing shaft 22 is displaced upwardly by the amount C thereof, in analogy with the construction according to FIG. 4, in order to lift the blank previously securely clamped in the axial gripper, upwardly out of the guide rods 50. Subsequently the swing arm 24 is swung upwards through 90° about the axis of the swing shaft 22. The swing arm retains this position until a work piece already clamped in the work spindle of a lathe 100 is finished treated. After the work piece finishing has been effected the swing arm is swung further in the same direction through again 90°, so that the radial gripper 88 engages over the periphery of the finished article and grips it. After the axial displacement of the swing shaft 22 for the purpose of withdrawing the finished article from the respective chuck, the gripper support 26 of the swing arm 24 swings about its longitudinal axis denoted by X, so that then the blank is directed towards the chuck of the work spindle. The necessarily resulting centre offset of the two grippers 28, 88 is compensated by a downward stroke movement of the mounting frame 20.

Thereafter the swing arm 24 together with the finished article is swung upwards and further as far as over the finished article store 98 into which the finished article is deposited after a lowering movement C. The deposition of the finished article in the finished article store occurs in this case in the following manner: The swing arm 24 moves into its inclined position below the horizontal position indicated by a dash-dotted line in FIG. 1. The finished article denoted by 94 is inserted between the guide rods 50 of this store by lowering the member of the mounting frame 20 supporting the swing shaft 22, by the maximum path C. Thereby the finished article store 102 of the finished article store which is located in the stacking position is located in a lifting position such that the previously deposited finished article is located at a spacing below the finished article which is now held by the axial gripper 28 and placed between the guide rods. The finished article store is then raised, towards the end preferably at a reduced speed, whereby the uppermost work piece comes into contact with the work piece still securely clamped in the axial gripper. Thereby the swing arm 24 is pressed upwards into the horizontal position. The end switch 82 actuated thereby stops the lifting device 62 and the clamping jaws 32 of the axial gripper 28 release the finished article. It is ensured thereby that a finished article, when it is released by the axial gripper, cannot drop onto the finished article located therebelow and cause damage to the surfaces.

After the release of the finished article the swing arm together with the swing shaft 22 is raised again in that the latter is displaced upwards parallel to itself. The gripper support 26 can then perform a rotation through 90° in order to swing the axial gripper 28 into its receiving position in which, in analogy with the operating steps described in connection with FIG. 1, i.e. in accordance with a predetermined programme, the next following blank is gripped by the work piece store 34, in that first the respective blank stack 38 is displaced upwardly and thereby the swing arm is moved into the horizontal position again. In the meantime the finished article store is lowered at high speed by the work piece length increased by a constant amount and in this position awaits the supply of the next following finished article. The path indicator 74 serves for detecting the path length to be travelled through at high speed. When the radial gripper has received a finished treated work piece, the succession of operating steps described is repeated.

I claim:

1. Apparatus for loading a machine tool having a horizontal work spindle, said apparatus comprising:
   a shaft,
   means mounting said shaft for rotary movement around its longitudinal axis and with its longitudinal axis parallel to the horizontal work spindle,
   a workpiece storage with at least one vertical stack for workpieces,
   a swing arm extending perpendicularly from said shaft,
   means mounting said swing arm on said shaft for displacement along the shaft axis and for pivotal movement about the shaft axis between a position adjacent to said workpiece storage and a position adjacent said tool,
   a lifting device for lifting at least said one stack of workpieces,
   means including at least one gripper on the swing arm adapted to be actuated to grip a workpiece which lies on the top of one stack of workpiece and which is to be loaded into the tool,
   an actuating device for actuating the gripper to grip a workpiece, said actuating device being inactive in an initial position of said arm in which said arm is inclined downwardly at an acute angle to the horizontal and rests on said one stack of workpieces.
   means responsive to movement of said lifting device for moving said arm from said initial position to a gripping position at which said arm is horizontal, and
   means responsive to movement of said arm from said initial position to said gripping position for activating said actuating means to cause said gripper to grip said top workpiece.

2. Apparatus as claimed in claim 1, wherein an axial abutment is provided on the gripper on the swing arm, and the swing arm rests on the workpiece stack via the abutment which is adjustable in position.

3. Apparatus for loading a machine tool having a horizontal work spindle, said apparatus comprising:
   a shaft,
   means mounting said shaft for rotary movement around its longitudinal axis and with its longitudinal axis parallel to the horizontal work spindle, and for vertical movement perpendicular to its longitudinal axis,
   means including at least one gripper on the swing arm adapted to be actuated to grip a workpiece,
   means for bringing workpieces to be loaded into the tool one at a time to a position at which they can be gripped by said one gripper,
   an actuating device for actuating the gripper to grip a workpiece, said actuating device being inactive in an initial position of said arm in which said arm is inclined downwardly at an acute angle to the horizontal and rests on a workpiece to be gripped,
   means for lowering said shaft to move said arm from said initial position to a horizontal position, and
   means responsive to movement of said arm from said initial position to said horizontal position for activating said actuating means to cause said gripper to grip a workpiece in said position to be gripped.

4. Apparatus as claimed in claim 3, wherein an axial abutment is provided on the gripper on the swing arm, and the swing arm rests on the workpiece via the abutment which is adjustable in position.

5. Apparatus for unloading workpieces from a machine tool having a horizontal work spindle, said apparatus comprising:
   a shaft,
   means mounting said shaft for rotary movement around its longitudinal axis and with its longitudinal axis parallel to the horizontal work spindle.
   a workpiece storage with at least one vertical stack for workpieces,
   a swing arm extending perpendicularly from said shaft,
   means mounting said swing arm on said shaft for displacement along the shaft axis and for pivotal movement about the shaft axis between a position adjacent to said workpiece storage and a position adjacent said tool,
   a lifting device for lifting at least said one stack of workpieces,
   means including at least one gripper on the swing arm adapted to be actuated to grip a workpiece loaded in said tool,
   an actuating device for actuating the gripper to grip a workpiece, said actuating device being active in an initial gripping position thereof in which said arm is inclined downwardly at an acute angle to the horizontal and rests on said one stack of workpieces,
   means responsive to movement of said lifting device for moving said arm from said initial position to a release position at which said arm is horizontal, and
   means responsive to movement of said arm from said initial position to said release position for deactivating said actuating means to cause said gripper to release the gripped workpiece.

6. Apparatus as claimed in claim 5, wherein an axial abutment is provided on the gripper on the swing arm, and the swing arm rests on the workpiece stack via the abutment which is adjustable in position.

* * * * *

UNITED STATES PATENT AND TRADEMARK OFFICE
CERTIFICATE OF CORRECTION

PATENT NO. : 4,195,961
DATED : April 1, 1980
INVENTOR(S) : Paul Waiblinger

It is certified that error appears in the above-identified patent and that said Letters Patent are hereby corrected as shown below:

Title Page Under [73], Assignee should read:

Index-Werke KG Hahn & Tessky

*Signed and Sealed this*

*Seventeenth* Day of *June 1980*

[SEAL]

Attest:

SIDNEY A. DIAMOND

*Attesting Officer*  *Commissioner of Patents and Trademarks*